United States Patent [19]

Blount

[11] 3,954,941

[45] May 4, 1976

[54] PROCESS FOR PRODUCTION OF MONOSILANDIOL

[76] Inventor: David H. Blount, 5450 Lea St., San Diego, Calif. 92105

[22] Filed: Aug. 16, 1974

[21] Appl. No.: 498,045

[52] U.S. Cl. .......................... 423/325; 423/512 R; 423/520; 423/551
[51] Int. Cl.² ........................................ C01B 33/00
[58] Field of Search ............ 423/325, 512, 520, 551

[56] References Cited
UNITED STATES PATENTS

| | | | |
|---|---|---|---|
| 2,810,628 | 10/1957 | Bailey et al. | 423/325 |
| 2,844,435 | 7/1958 | Wagner et al. | 423/325 |
| 3,223,474 | 12/1965 | Nitzsche et al. | 423/325 |
| 3,345,132 | 10/1967 | Wulf | 423/325 |
| 3,615,272 | 10/1971 | Collins et al. | 423/325 |

OTHER PUBLICATIONS

Hackh's Chemical Dictionary, 4th Ed., by Julius Grant, (1969), pp. 609 and 610, McGraw–Hill Book Co., N.Y.
"A Comp. Treatise on Inorg. and Theoretical Chem.", J. W. Mellor, Vol. 6, 1925, p. 216, Longmans, Green & Co., N.Y.

Primary Examiner—Edward Stern

[57] ABSTRACT

A dry alkaline earth metal silicate or an alkali metal silicate is reacted with a concentrated mineral acid, forming a white granular mixture. The mineral acid is then neutralized with a dry alkali metal carbonate or hydroxide producing monosilanal and monosilanic acid. Monosilanal will react with water to produce monosilandiol.

3 Claims, No Drawings

PROCESS FOR PRODUCTION OF MONOSILANDIOL

The present invention relates to a process for the production of monosilanal ($H_2SiO$), monosilandiol [$SiH_2(OH)_2$] and monosilanic acid (H.SiO.OH) by reacting a dry alkaline earth metal silicate or an alkali metal silicate with a concentrated mineral acid. The mineral acid is then neutralized with a dry alkaline earth metal or an alkali metal hydroxide or carbonate to form monosilanic acid (H.SiO.OH) or monosilanal ($H_2SiO$). Monosilanal will react with water to form monosilandiol.

The alkaline earth metal silicate usually used is calcium metasilicate. The alkali metal silicates usually used are sodium metasilicate and sodium metasilicate pentahydrate. Other alkaline earth metal silicates and alkali metal silicate may be used. It is necessary to use the dry form of the above silicates to prevent formation of silicic acid and silicon dioxide.

The mineral acid usually used is concentrated sulfuric acid. When other mineral acids are used, some silicic acid and silicon dioxide is also produced.

The alkaline earth metal carbonate usually used is calcium carbonate. The alkaline earth metal hydroxide usually used is calcium hydroxide. The alkali metal carbonate usually used is sodium carbonate. Many other compounds may be used to neutralize the mineral acid, such as metals, metal oxides, metal hydroxides, metal carbonates, alkaline earth metals, alkali metal oxides, and alkali metal salts of weak organic and inorganic acids.

I have discovered that when dry sodium metasilicate is gradually added to concentrated sulfuric acid in the ratio of 1—1 mols, 1–2 mols, or 1–3 mols, and then washed with water or first neutralized with sodium carbonate, either way, silicon dihydroxys are produced. The silicon dihydroxy is prodominately monosilanic acid and a smaller amount of monosilandiol. It is very difficult to separate the two; both are a fine, white granular compound.

When dry sodium metasilicate is gradually reacted with concentrated sulfuric acid in the ratio of 1–4 mols and then washed with water, monosilanic acid and a lesser percent of monosilandiol are produced.

I have discovered that monosilanal ($H_2SiO$) can be produced by the following steps: (1) React dry sodium metasilicate with concentrated sulfuric acid in the ratio of 1–4 mols. (2) Filter off the salt and water from the fine, white granular mixture of silicon hydrogen sulfates. (3) React the silicon hydrogen sulfates with a dry sodium carbonate to neutralize the sulfates.

Water must not be added in the above reaction because it will react with the silicon hydrogen sulfates or monosilanal to form monosilanic acid and monosilandiol. Monosilanal produced in this invention is a white granular compound that readily reacts with many organic compounds, such as alcohols, glycols, phenols, urea, aldehydes, ketones, unsaturated hydrocarbons, halogen hydrocarbons, nitriles, isonitriles, amines, and others. It may also be co-polymerized with organic compounds by a peroxide. It will readily react with water to form monosilandiol $SiH_2(OH)_2$. After monosilanal reacts with organic compounds such as alcohols, glycol, phenol, urea, etc., it is soluble in dilute sulfuric acid. Monosilanal is rapidly destroyed by heat to silicon dioxide, silicon monoxide and water. Monosilanal will readily react with many inorganic compounds to form new compounds.

Monosilanic acid and monosilandiol produced in this invention may be reacted with many inorganic compounds. It may be used in the polymerization of many plastics, elastomers and natural products, as a filler in elastomers, resins, molding powder, pigments, as gas and oil absorbents, as a vehicle for insecticides and aromatics, as a thickening and thixotropic agent for many liquids. They are readily soluble in a dilute solution of alkali metal hydroxide and will readily react with alkali metal hydroxides to form new compounds. When in a solution, they may be used as a coating or as a paint when pigments are added. They are readily soluble in "water glass" or solutions containing a salt of weak acid and a strong base.

The primary object of the present invention is to produce monosilanal ($H_2SiO$), which can be reacted chemically with water to form monosilandiol [$SiH_2(OH)_2$]. Another object is to produce monosilanic acid (H.SiO.OH).

A further object is to provide new and useful silicon compounds which will readily react with organic and inorganic compounds to form new and useful compounds.

Still another object is to produce silicon compounds that are readily soluble in dilute alkali solutions.

Still another object is to produce a silicon compound, monosilanal ($H_2SiO$) that can be co-polymerized with organic compounds used in plastics, elastomers and natural products.

The chemical reaction of sodium metasilicate with concentrated sulfuric acid is complicated, but is prodominately an attachment of sulfuric acid or water to silicon monoxide, after the sodium metasilicate has been reduced by sulfuric acid to silicon monoxide.

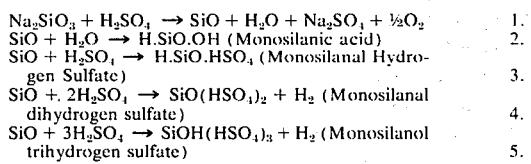

| | |
|---|---|
| $Na_2SiO_3 + H_2SO_4 \rightarrow SiO + H_2O + Na_2SO_4 + \frac{1}{2}O_2$ | 1. |
| $SiO + H_2O \rightarrow H.SiO.OH$ (Monosilanic acid) | 2. |
| $SiO + H_2SO_4 \rightarrow H.SiO.HSO_4$ (Monosilanal Hydrogen Sulfate) | 3. |
| $SiO + 2H_2SO_4 \rightarrow SiO(HSO_4)_2 + H_2$ (Monosilanal dihydrogen sulfate) | 4. |
| $SiO + 3H_2SO_4 \rightarrow SiOH(HSO_4)_3 + H_2$ (Monosilanol trihydrogen sulfate) | 5. |

When sodium metasilicate is reacted with sulfuric acid in the ratio of 1—1 or 1–2 mols, the silicon monoxide reacts with the water produced in the reaction to form monosilanic acid. When the ratio of 1–3 mols are used, monosilanal hydrogen sulfate is produced but immediately reacts with water to form monosilanic acid. When sodium silicate is reacted with sulfuric acid in the ratio of 1–4 mols, monosilanal hydrogen sulfate (H.SiO.HSO_4) and monosilanal dihydrogen sulfate [SiO(HSO_4)_2] are formed. The excess amount of salt and water produced in the reaction prevents all of the sulfuric acid from reacting with the sodium silicate. Both the monosilanal hydrogen sulfate and monosilanal dihydrogen sulfates react with dry sodium carbonate to form monosilanal ($H_2SiO$).

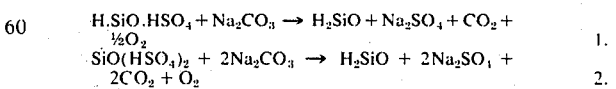

| | |
|---|---|
| $H.SiO.HSO_4 + Na_2CO_3 \rightarrow H_2SiO + Na_2SO_4 + CO_2 + \frac{1}{2}O_2$ | 1. |
| $SiO(HSO_4)_2 + 2Na_2CO_3 \rightarrow H_2SiO + 2Na_2SO_4 + 2CO_2 + O_2$ | 2. |

When monosilanal hydrogen sulfate, monosilanal dihydrogen sulfate and monosilanal react with water, monosilanic acid and monosilandiol are formed.

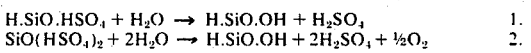

| | |
|---|---|
| $H.SiO.HSO_4 + H_2O \rightarrow H.SiO.OH + H_2SO_4$ | 1. |
| $SiO(HSO_4)_2 + 2H_2O \rightarrow H.SiO.OH + 2H_2SO_4 + \frac{1}{2}O_2$ | 2. |

When monosilanal reacts with water, monosilandiol is formed.

$$H_2SiO + H_2O \rightarrow SiH_2(OH)_2 \qquad 1.$$

To test for silane groups produced in this invention, a suspension of the compounds produced in this invention was made in water. A silver nitrate solution was added to the suspension, and in a short time the silver nitrate was reduced; this caused the silver to be precipitated by the reduction, and caused the suspension to change from a brown to a black color.

My invention will be illustrated in greater detail by the specific examples which follow, it being understood that these are merely illustrative of, and not limited to, procedures which may be used in the production of monosilanal ($H_2SiO$), monosilanic acid (H.SiO.OH), and monosilandiol [$SiH_2(OH)_2$], in accordance with this invention.

EXAMPLE I

Dry sodium metasilicate is slowly added to a concentrated sulfuric acid in the ratio of 1–4 mols, over a period of 10–15 minutes, with agitation and keeping the temperature below 100°C. The reaction is completed in 1–4 hours. A fine, white granular mixture of silico-hydrogen sulfates, sodium hydrogen sulfate and water is formed. The water and as much as possible of the sodium hydrogen sulfate is filtered off.

The fine white granular mixture of silico-hydrogen sulfates is slowly added to sodium carbonate in the ratio of 1½ mols of sulfuric acid which is being used to 1 mol of sodium carbonate. This is mixed and the temperature is kept below 100°C. The reaction is completed in 20–30 minutes, forming a fine, white granular mixture, monosilanal ($H_2SiO$) and sodium sulfate.

To produce monosilandiol, the fine, white granular mixture of monosilanal and sodium sulfate is washed with water and filtered, removing the sodium sulfate. The monosilanal reacts rapidly with water to form monosilandiol. The reaction is complete in 10–20 minutes at 25°–75°C.

Chemical reactions to produce monosilanal and monosilandiol:

$$Na_2SiO_3 + 4H_2SO_4 \rightarrow SiO(HSO_4)_2 + 2NaHSO_4 + 2H_2O \qquad 1.$$
$$SiO(HSO_4)_2 + 2Na_2CO_3 \rightarrow H_2SiO + 2Na_2SO_4 + 2CO_2 + O_2 \qquad 2.$$
$$H_2SiO + H_2O \rightarrow SiH_2(OH)_2 \qquad 3.$$

EXAMPLE II

Dry sodium metasilicate pentahydrate is gradually added to concentrated sulfuric acid in ratio of 1–2 mols over a period of 15–20 minutes with agitation and keeping the temperature below 100°C. The reaction is completed in 1–4 hours, forming a fine, white granular mixture of monosilanic acid and sodium hydrogen sulfate.

The water produced in the reaction immediately reacts with the silicon monoxide to form monosilanic acid (H.SiO.OH). Water is added and the excess sodium hydrogen sulfate is filtered off the fine, white granular compound. It is then air dried and forms a fine, white powder. Monosilanic acid produced in this example is readily soluble in dilute sodium hydroxide solution, "water glass", and aqueous solution of salts formed by weak acid and alkali metal hydroxides.

Monosilanic acid will readily react with warm (50°–75° C) aqueous sodium hydroxide to form sodium monosilanate. When an alkali solution of monosilanic acid is added to a dilute solution of sulfuric acid, it will remain in solution as long as the pH remains below 5. If the pH rises above 6, the monosilanic acid will gel. It is resoluble in warm alkali solutions.

Chemical reactions to produce monosilanic acid:

$$Na_2SiO_3 + 2H_2SO_4 \rightarrow H.SiO.OH + 2NaHSO_4 + \tfrac{1}{2}O_2 \qquad 1.$$

EXAMPLE III

Dry granular calcium metasilicate is slowly added to concentrated sulfuric acid in the ratio of 1–4 mols over a period of 20–30 minutes, keeping the temperature below 100°C. with agitation. The reaction is completed in 2–4 hours, forming a fine, white granular mixture of silicon hydrogen sulfates, calcium sulfate, and diluted sulfuric acid.

The dilute sulfuric acid is filtered off the fine, white granular mixture. It is then slowly mixed with calcium hydroxide in the ratio of 4 mols of sulfuric acid to 2 mols of calcium hydroxide. The reaction is completed in 20–30 minutes, forming monosilanal ($H_2SiO$) and calcium sulfate.

Chemical reaction to produce monosilanal:

$$CaSiO_3 + 4H_2SO_4 \rightarrow SiO(HSO_4)_2 + CaSO_4 + 2H_2O + H_2SO_4 \qquad 1.$$
$$SiO(HSO_4)_2 + 2CaOH \rightarrow H_2SiO + 2CaSO_4 + H_2O + O_2 \qquad 2.$$

EXAMPLE IV

Dry granular sodium metasilicate is slowly added to concentrated sulfuric acid in the ratio of 1–4 mols over a period of 15–20 minutes, keeping the temperature below 100° C, with agitation. The reaction is completed in 1–4 hours, forming a fine, white granular mixture of monosilanal hydrogen sulfate (H.SiO.HSO_4), monosilanal dihydrogen sulfate [$SiO(HSO_4)_2$] and sodium hydrogen sulfate.

The excess water, sulfuric acid and sodium hydrogen sulfate are filtered off the fine, white granular mixture. The mixture is then slowly mixed with sodium carbonate, over a period of 20–30 minutes in the ratio of 4 mols of sulfuric acid to 3 mols of sodium carbonate, keeping the temperature below 100° C. The reaction is completed in 20–30 minutes, forming a fine, white granular mixture of monosilanal and sodium sulfate.

Chemical reactions to produce monosilanal ($H_2SiO$):

$$Na_2SiO_3 + 4H_2SO_4 \rightarrow SiO(HSO_4)_2 + 2NaHSO_4 + H_2O \qquad 1.$$
$$SiO(HSO_4)_2 + 2Na_2CO_3 \rightarrow H_2SiO + 2Na_2SO_4 + 2CO_2 + O_2 \qquad 2.$$

EXAMPLE V

Dry granular sodium metasilicate is slowly added to concentrated sulfuric acid in the ratio of 1–4 mols, with agitation over a period of 15–20 minutes, while keeping the temperature below 100° C. The reaction is completed in 1–4 hours, forming a fine, white granular mixture. The water and sodium hydrogen sulfate is filtered off.

Concentrated sulfuric acid is added to the fine, white granular mixture in the ratio of half of the original mols of sulfuric acid, with agitation and keeping the temperature below 100° C. The reaction is completed in 15–20 minutes, forming a fine, white granular mixture of monosilanal dihydrogen sulfate [$SiO(HSO_4)_2$] and monosilanol trihydrogen sulfate [SiOH(HSO$_4$)$_3$]. The excess sulfuric acid is filtered off.

The fine, white granular mixture of silico-hydrogen sulfates are slowly mixed with sodium carbonate in the ratio of 3 mols of sodium carbonate to each mol of sodium silicate. The temperature is kept below 100° C, and the reaction is completed in 20–30 minutes, forming a fine, white granular mixture of monosilanal (H$_2$SiO), monosilanol [SiH$_3$(OH)], and sodium sulfate. The ratio of monosilanal to monosilanol has not been determined. When monosilanol is added to water, hydrogen is given off. There is only a small percentage of monosilanol produced.

Monosilandiol is formed when water is added to monosilanal and monosilanol.

Chemical reactions to form monosilanal and monosilanol:

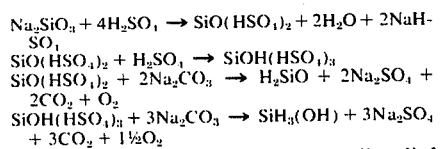

Chemical reactions to produce monosilandiol:

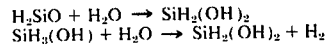

EXAMPLE VI

Dry sodium metasilicate pentahydrate is slowly added to concentrated sulfuric acid in the ratio of 1—1 mols over a period of 10–20 minutes, keeping the temperature below 100° C with agitation. Oxygen is produced in the reaction. The reaction is completed in 1–4 hours, forming a fine, white granular mixture of monosilanic acid and sodium sulfate. The mixture is then washed with water and the sodium sulfate is filtered off, leaving the monosilanic acid, which is air dried and forms a fine, white powder.

Chemical reactions to produce monosilanic acid:

What is claimed as new and desired to be protected by Letters Patent is set forth in the appended claims:

1. A process for the production of monosilandio[-SiH$_2$(OH)$_2$] which comprises the steps of:
   a. providing 1 mol of a dry alkali metal metasilicate, and
   b. adding said alkali metal metasilicate slowly to concentrated sulfuric in the ratio of 1:4 mols over a period of 10 to 15 minutes;
   c. mixing and maintaining said mixture at a temperature below 100°C until the chemical reaction is completed in 1 to 4 hours;
   d. filtering off water and alkali metal hydrogen sulfate from the white granular mixture of monosilanal hydrogen sulfate (H.SiO.HSO$_4$) and monosilanal dihydrogen sulfate [SiO(HSO$_4$)$_2$];
   e. adding 3 mols of sodium carbonate to said mixture while stirring, keeping the temperature below 100°C. and the chemical reaction is completed in 20 to 30 minutes, thereby
   f. producing a white granular mixture of monosilanal (H.SiO.H) and sodium sulfate; then
   g. adding water and washing said mixture,
   h. filtering said mixture to remove water and sodium sulfate; thereby
   i. producing a white granular compound, monosilandiol [H$_2$Si(OH)$_2$].

2. The process of claim 1 wherein the dry alkali metal metasilicate is sodium metasilicate pentahydrate, and the alkali metal hydrogen sulfate is sodium hydrogen sulfate in step (d).

3. The process of claim 1 wherein the dry alkali metal metasilicate is sodium metasilicate, and the alkali metal is sodium hydrogen sulfate in step (d).

* * * * *